(12) United States Patent
Huang et al.

(10) Patent No.: US 11,837,909 B2
(45) Date of Patent: Dec. 5, 2023

(54) INTELLIGENT STABLE POWER SUPPLY SYSTEM

(71) Applicant: CHICONY POWER TECHNOLOGY CO., LTD., New Taipei (TW)

(72) Inventors: Shih-Nan Huang, New Taipei (TW); Hao-Chieh Chang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/687,077

(22) Filed: Mar. 4, 2022

(65) Prior Publication Data
US 2023/0216332 A1    Jul. 6, 2023

(30) Foreign Application Priority Data

Dec. 30, 2021 (TW) ................................ 110149613

(51) Int. Cl.
*H02J 9/06* (2006.01)
*H02J 3/00* (2006.01)

(52) U.S. Cl.
CPC .............. *H02J 9/061* (2013.01); *H02J 3/007* (2020.01); *H02J 9/068* (2020.01)

(58) Field of Classification Search
CPC .... H02J 9/061; H02J 9/06; H02J 9/068; H02J 3/007; H01H 2300/018
See application file for complete search history.

(56) References Cited

U.S. PATENT DOCUMENTS

| | | | |
|---|---|---|---|
| 5,939,799 A * | 8/1999 | Weinstein | H02J 1/10 307/64 |
| 10,355,600 B1 * | 7/2019 | Chiu | H02M 3/33507 |
| 10,958,106 B2 | 3/2021 | Matsuda | |
| 2013/0106190 A1 * | 5/2013 | Lin | H02J 9/061 307/64 |
| 2015/0123473 A1 * | 5/2015 | Braylovskiy | H02J 1/102 307/64 |
| 2020/0014239 A1 * | 1/2020 | Liu | H02J 1/10 |
| 2020/0127495 A1 | 4/2020 | Matsuda | |

(Continued)

FOREIGN PATENT DOCUMENTS

| | | |
|---|---|---|
| CN | 102437721 A | 5/2012 |
| CN | 106787125 B | 10/2019 |
| CN | 107994679 B | 12/2019 |

(Continued)

*Primary Examiner* — Ryan Johnson
(74) *Attorney, Agent, or Firm* — Muncy, Geissler, Olds & Lowe

(57) ABSTRACT

An intelligent stable power supply system includes a first power input module, a first non-return valve module, an active pulse wave generation unit, a DC power processing unit, and a control unit. When the control unit determines that a first voltage value is less than a first predetermined value or greater than a second predetermined value, and a second voltage value is between the first predetermined value and the second predetermined value, the control unit firstly controls the first non-return valve module being from an on state to an off state, and then controls the second non-return valve module being from an off state to an on state so that a power signal of the second power input module flows into the active pulse wave generation unit and the DC power processing unit to output a DC power signal.

13 Claims, 8 Drawing Sheets

(56) References Cited

U.S. PATENT DOCUMENTS

2021/0242770 A1\*  8/2021  Zhang  ................... H03K 17/16

FOREIGN PATENT DOCUMENTS

| CN | 112952975 A | 6/2021 |
|----|-------------|--------|
| TW | 200531417 A | 9/2005 |
| TW | 201316641 A | 4/2013 |
| TW | 201320140 A | 5/2013 |
| TW | 201325003 A | 6/2013 |
| TW | M488805 U   | 10/2014 |
| TW | I536709 B   | 6/2016 |
| TW | I630786 B   | 7/2018 |
| TW | I687017 B   | 3/2020 |
| TW | 202129463 A | 8/2021 |

\* cited by examiner

INTELLIGENT STABLE POWER SUPPLY SYSTEM

BACKGROUND

Technical Field

The present disclosure relates to an intelligent stable power supply system, and more particularly to an intelligent stable power supply system having a hold-time mechanism.

Description of Related Art

The statements in this section merely provide background information related to the present disclosure and do not necessarily constitute prior art.

With the rise of the Internet of Things (IoT), the demand for servers and cloud hard drives is increasing day by day, and its development trend is increasingly established. Related electronic devices often need to store important data and transmit related data, and these electronic devices need to maintain stable power at all times. Although Taiwan's mains electricity is relatively stable, under the trend of globalization, cloud data centers are usually located all over the world, and the stability of mains electricity varies from country to country. There is uncertainty about whether the power supply of related electronic devices such as servers and cloud hard drives can supply power stably. In particular, when power companies in emerging countries or regions suffer from insufficient power generation, maintenance of power generation equipment, unwarranted power outages or unexpected power outages, these electronic devices will not be able to operate and will be interrupted, resulting in a transnational digital information disaster.

In order to avoid the situation that the electronic device is forced to be interrupted due to the abnormal or unstable mains power supply, the conventional manner is to directly connect an uninterruptible power supply system to the power supply system of the electronic device. When the commercial power grid cannot supply power stably, the uninterruptible power supply system outputs a DC power supply for use by electronic device.

However, the control of the traditional UPS is very complicated and the cost is high. Therefore, how to design an intelligent stable power supply system, especially an intelligent stable power supply system that provides continuous power supply for a hold-up time, to solve the problems and technologies in the existing technology.

SUMMARY

An object of the present disclosure is to provide an intelligent stable power supply system to solve the problems of existing technology.

In order to achieve the above-mentioned object, the intelligent stable power supply system includes a first power input module, a first non-return valve module, an active pulse wave generation unit, a DC power processing unit, and a control unit. The first non-return valve module is connected to the first power input module. The active pulse wave generation unit is connected to the first non-return valve module through an input end, and the active pulse wave generation unit makes a positive half-cycle and a negative half-cycle of a power signal received by the input end in turned into a half-cycle in the same direction, and then continuously outputs a pulse signal. The DC power processing unit receives and processes the pulse signal, and output a DC power signal. The DC power processing unit includes a hold-up time circuit, and the hold-up time circuit provides a voltage during a hold-up time to maintain an output of the DC power signal. The control unit controls a detection unit to detect and return a first voltage value of the first power input module and a second voltage value of a second power input module. When the control unit determines that the first voltage value is less than a first predetermined value or greater than a second predetermined value, and the second voltage value is between the first predetermined value and the second predetermined value, the control unit firstly controls the first non-return valve module being from an on state to an off state to prevent a power signal of the second power input module from flowing into the first power input module, and then control a second non-return valve module connected to the second power input module being from an off state to an on state so that the power signal of the second power input module flows into the active pulse wave generation unit and the DC power processing unit to output the DC power signal. The current intensity and the current direction of the power signal of the first power input module and the power signal of the second power input module received by the input end of the active pulse wave generation unit have periodic changes, and an average current value of the power signal of the first power input module and the average current value of the power signal of the second power input module in one cycle tend to be zero. A time from when the first non-return valve module is turned off to when the second non-return valve module is turned on is less than or equal to the hold-up time.

Another object of the present disclosure is to provide an intelligent stable power supply system to solve the problems of existing technology.

In order to achieve the above-mentioned object, the intelligent stable power supply system includes a first power input module, a first non-return valve module, a second power input module, a second non-return valve module, a third power input module, a third non-return valve module, an active pulse wave generation unit, a DC power processing unit, and a control unit. The first non-return valve module is connected to the first power input module. The second non-return valve module is connected to the second power input module. The third non-return valve module is connected to the third power input module. When the first non-return valve module is in an on state, the second non-return valve module and the third non-return valve module are in an off state; when the second non-return valve module is in the on state, the first non-return valve module and the third non-return valve module are in the off state; when the third non-return valve module is in the on state, the first non-return valve module and the second non-return valve module are in the off state. The active pulse wave generation unit is connected to the first non-return valve module, the second non-return valve module, and the third non-return valve module to respectively receive a first power signal provided by the first power input module and flowing through the first non-return valve module, a second power signal provided by the second power input module and flowing through the second non-return valve module, or a third power signal provided by the third power input module and flowing through the third non-return valve module. The active pulse wave generation unit makes a positive half-cycle and a negative half-cycle of the first power signal, a positive half-cycle and a negative half-cycle of the second power signal, or a positive half-cycle and a negative half-cycle of the third power signal in turned into a half-cycle in the same direction, and then continuously outputs a pulse signal. The DC power processing unit receives and processes the pulse signal, and output a DC power signal, and the DC power processing unit includes a hold-up time circuit. The hold-up time circuit provides a voltage during a hold-up time to maintain an output of the DC power signal. The control unit controls a detection unit to detect and return a first voltage value of the first power input module, a second voltage value of the second power input module, and a third voltage value of the third power input module. When the control unit determines that the first voltage value is less than a first predetermined value or greater than a second predetermined value, the control unit firstly controls the first non-return valve module being turned off, and then controls the second non-return valve module or the third non-return valve module being turned on so that the second power signal or the third power signal flows into the active pulse wave generation unit and the DC power processing unit to output the DC power signal. The current intensity and the current direction of the first power signal, the second power signal, and the third power signal have periodic changes, and an average current value of the first power signal, the average current value of the second power signal, and the average current value of the third power signal in one cycle tend to be zero. A time from when the first non-return valve module is turned off to when the second non-return valve module is turned on or to when the third non-return valve module is less than or equal to the hold-up time.

Further another object of the present disclosure is to provide an intelligent stable power supply system to solve the problems of existing technology.

In order to achieve the above-mentioned object, the intelligent stable power supply system includes a first power input module, a first non-return valve module, a second power input module, a second non-return valve module, an active pulse wave generation unit, a DC power processing unit, and a control unit. The first power input module outputs a first power signal. The first non-return valve module is connected to the first power input module. The second power input module outputs a second power signal. The second non-return valve module is connected to the second power input module, wherein one of the first non-return valve module and the second non-return valve module is in an on state at the same time. The active pulse wave generation unit is connected to the first non-return valve module and the second non-return valve module, and makes a positive half-cycle and a negative half-cycle of the first power signal or a positive half-cycle and a negative half-cycle of the second power signal in turned into a half-cycle in the same direction, and then continuously outputs a pulse signal. The DC power processing unit receives and processes the pulse signal, and output a DC power signal. The control unit controls a detection unit to detect and return a first voltage value of the first power input module and a second voltage value of the second power input module. When the control unit determines that a predetermined event occurs, the control unit firstly controls the first non-return valve module being from an on state to an off state, and then controls the second non-return valve module being from an off state to an on state so that the second power signal flows into the active pulse wave generation unit and the DC power processing unit to output the DC power signal.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
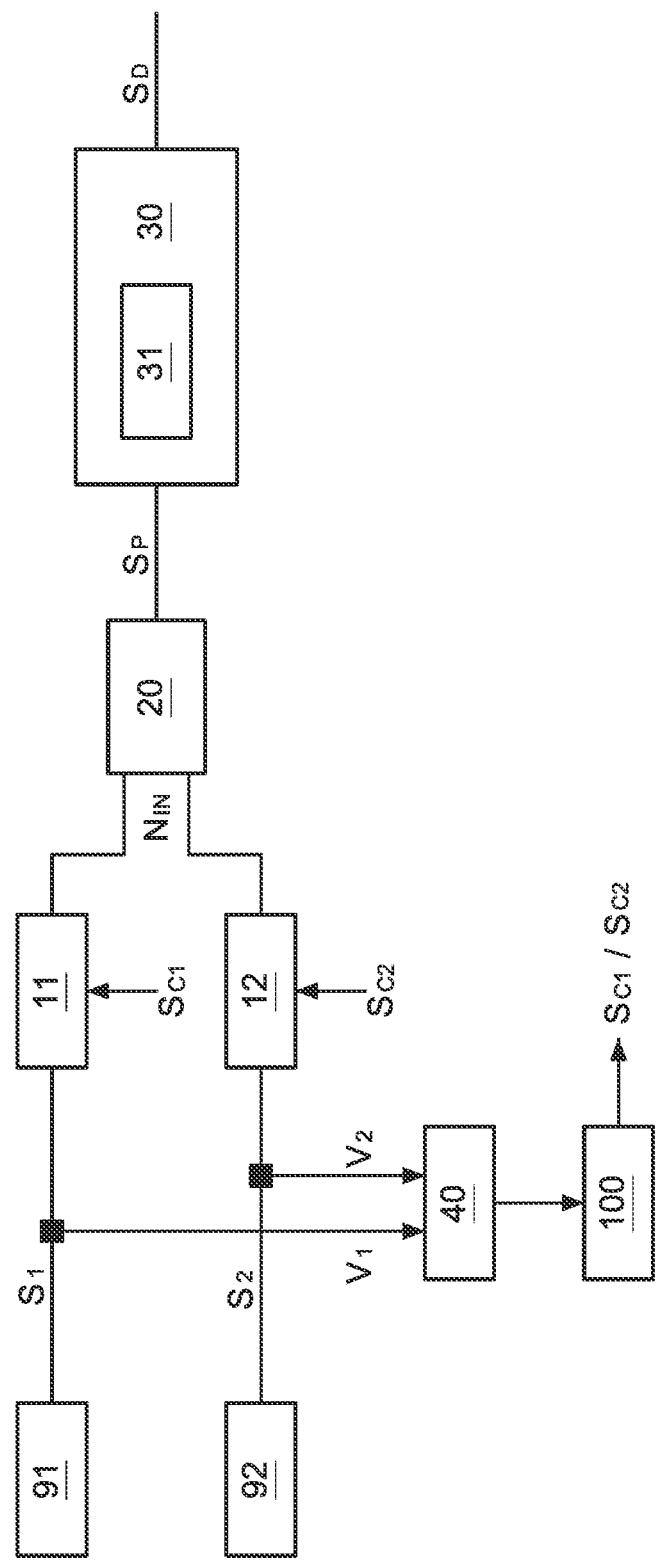
FIG. 1 is a block diagram of an intelligent stable power supply system according to a first embodiment of the present disclosure.

Reference will now be made to the drawing figures to describe the present disclosure in detail. It will be understood that the drawing figures and exemplified embodiments of present disclosure are not limited to the details thereof.

Figure 2:
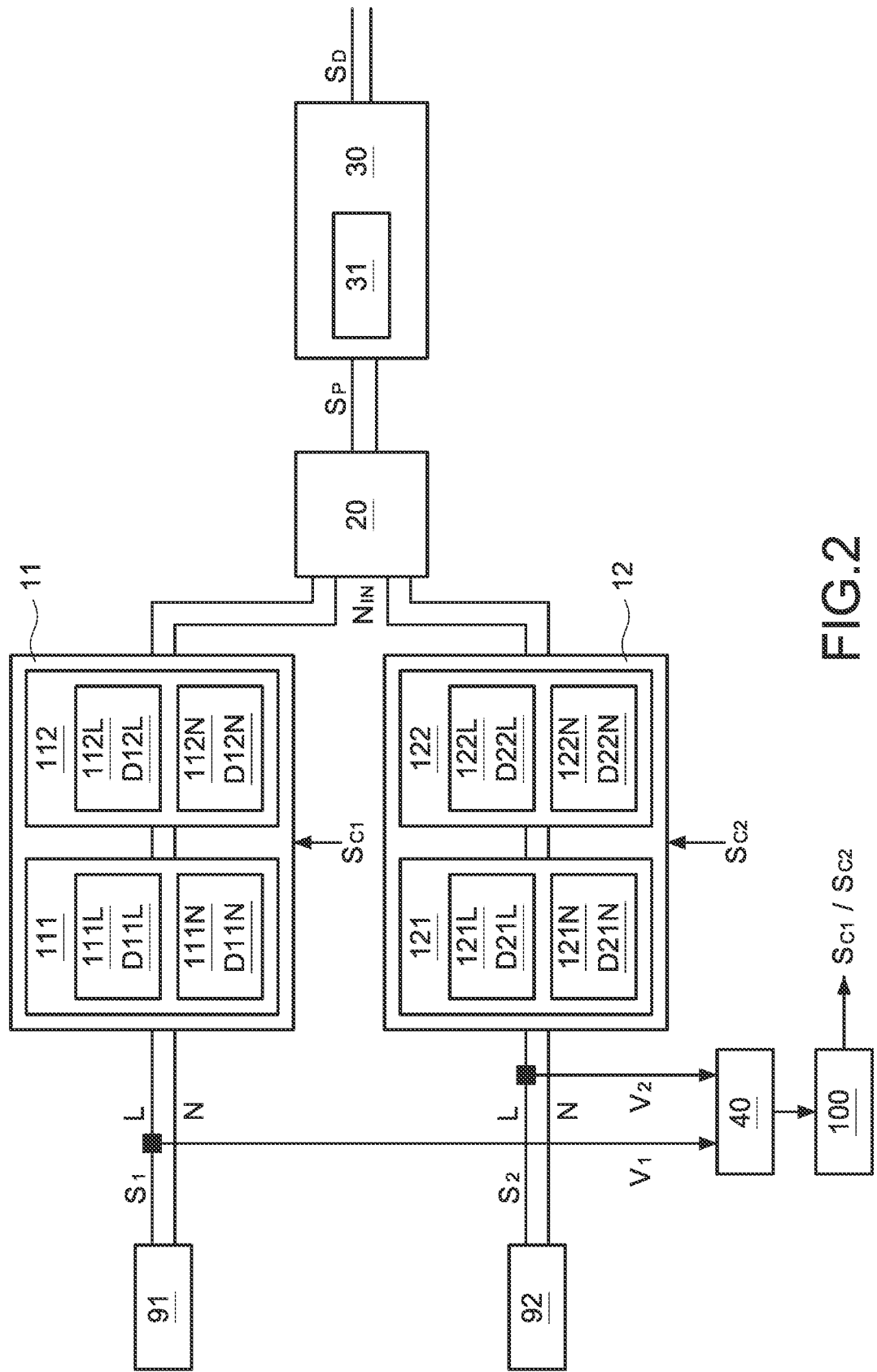
FIG. 2 is a detailed block diagram of the intelligent stable power supply system according to the first embodiment of the present disclosure.

Please refer to FIG. 1 and FIG. 2, which show a block diagram of an intelligent stable power supply system and a detailed block diagram of the intelligent stable power supply system according to a first embodiment of the present disclosure, respectively. The intelligent stable power supply system includes a first power input module 91, a second power input module 92, a first non-return valve module 11, a second non-return valve module 12, an active pulse wave generation unit 20, a DC power processing unit 30, a detection unit 40, and a control unit 100.

The first non-return valve module 11 is connected to the first power input module 91, and the second non-return valve module 12 is connected to the second power input module 92. The active pulse wave generation unit 20 is connected to the first non-return valve module 11 through an input end $N_{IN}$. The active pulse wave generation unit 20 makes the positive half-cycle and the negative half-cycle of the power signal received from the input end $N_{IN}$ in turned into a half-cycle in the same direction, and then continuously outputs a pulse signal SP.

The DC power processing unit 30 includes a hold-up time circuit 31. The DC power processing unit 30 receives the pulse signal SP and processes the pulse signal SP to output a DC power signal $S_D$. The hold-up time circuit 31 provides a voltage during a hold-up time to maintain the output of the DC power signal $S_D$. Therefore, when the intelligent stable power supply system is shut down or powered off, that is, when the input power provided by the first power input module 91 or the second power input module 92 is abnormal, it can be normally maintained for a time period so that the output voltage of the intelligent stable power supply system can be normally maintained at a specific output level within the time period so that the intelligent stable power supply system can still effectively output voltage during the hold-up time. In one embodiment, the hold-up time circuit 31 may be implemented by, for example, but not limited to, a bulk capacitor disposed on the output side.

Figure 7:
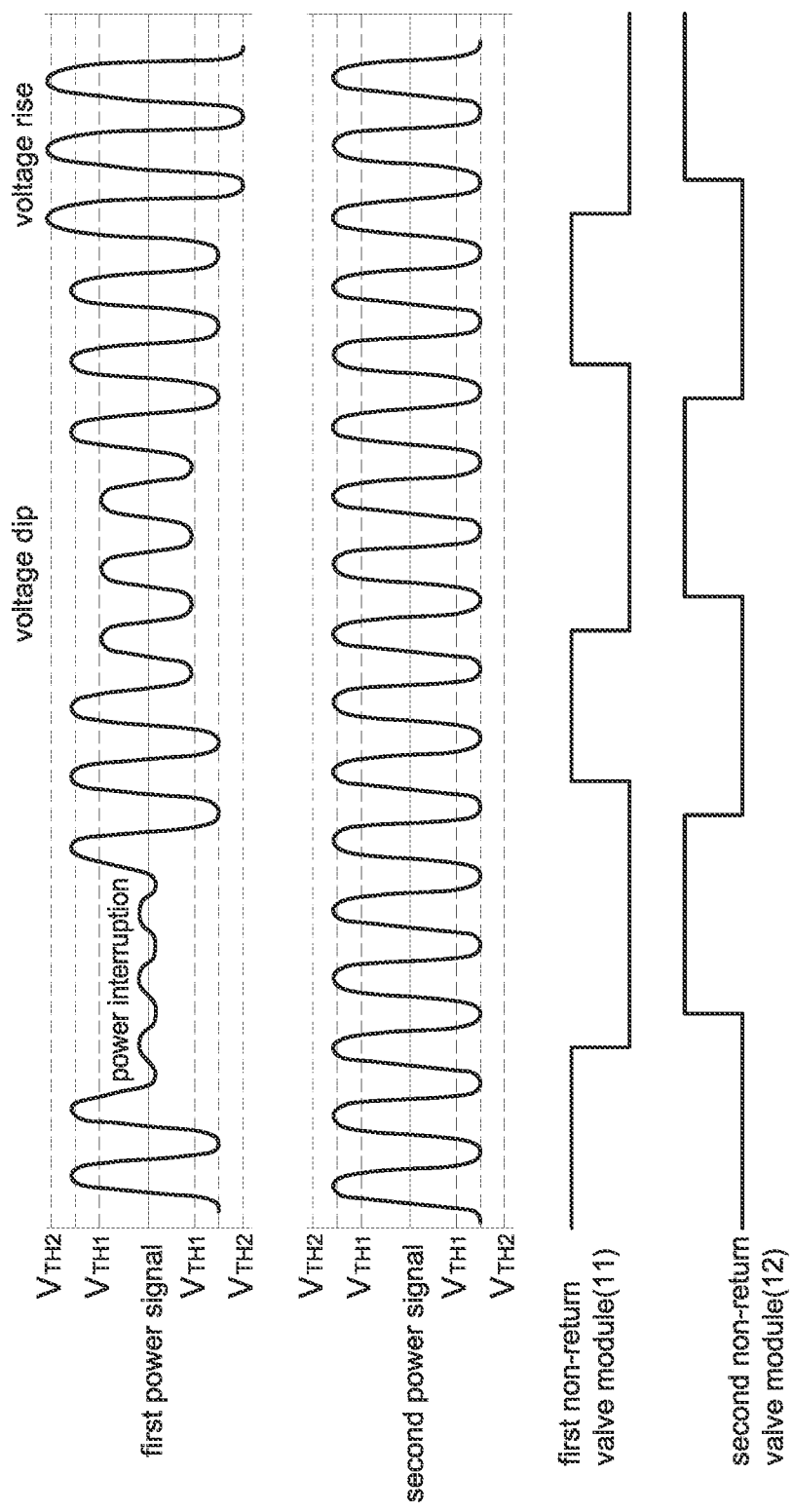
FIG. 7 is a schematic diagram of conversion between different non-return valve modules according to the present disclosure.
Figure 8:
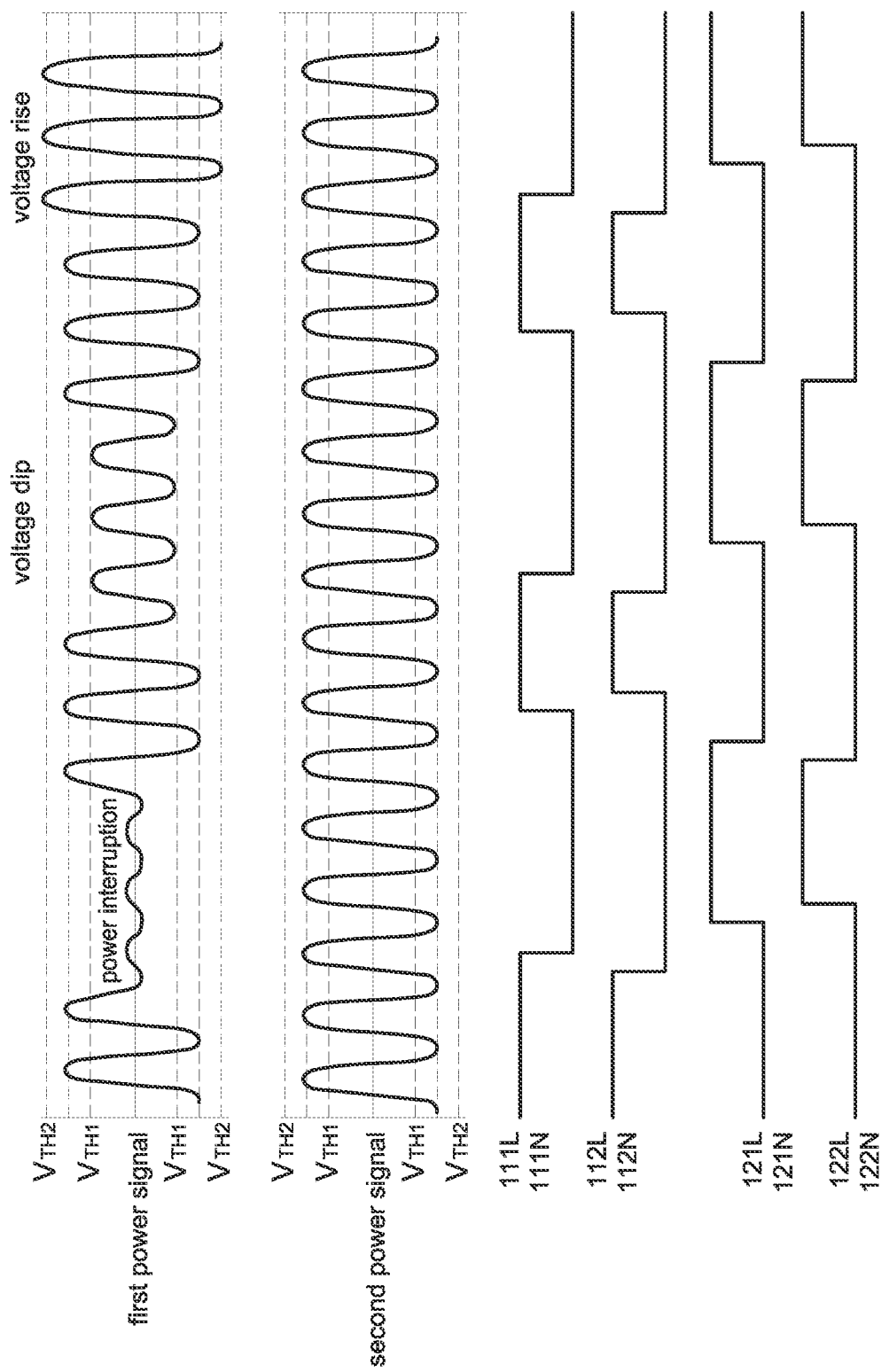
FIG. 8 is a schematic diagram of conversion between different non-return valves according to the present disclosure.

The control unit 100 controls the detection unit 40 to detect and return a first voltage value $V_1$ of a first power signal $S_1$ and a second voltage value $V_2$ of a second power signal $S_2$. When the control unit 100 detects that an absolute value of the first voltage value $V_1$ is less than a first predetermined value $V_{TH1}$ (that is, the first power signal $S_1$ is in a power interruption condition or in a voltage dip condition as shown in FIG. 7 or FIG. 8) or is greater than a second predetermined value $V_{TH2}$ (that is, the first power signal $S_1$ is in a voltage rise condition as shown in FIG. 7 or FIG. 8), and the second voltage value $V_2$ is between the first predetermined value $V_{TH1}$ and a second predetermined value $V_{TH2}$ (that is, the second power signal $S_2$ is in a normal power supply condition as shown in FIG. 7 or FIG. 8), the control unit 100 firstly controls the first non-return valve module 11 being from an on state to an off state (for example, a signal $S_{C1}$ that controls the first non-return valve module 11 changes from a high level to a low level) so as to prevent the second power signal $S_2$ from flowing into the first power input module 91. Afterward, the control unit 100 controls the second non-return valve module 12 connected to the second power input module 92 being from an off state to an on state (for example, a signal $S_{C2}$ that controls the second non-return valve module 12 changes from a low level to a high level) so that the second power signal $S_2$ flows into the active pulse wave generation unit 20 and the DC power processing unit 30 to output the DC power signal $S_D$.

The current intensity and current direction of the first power signal $S_1$ and the second power signal $S_2$ received by the input end $N_{IN}$ of the active pulse wave generation unit 20 have periodic changes, and the average current value of the first power signal $S_1$ and the average current value of the second power signal $S_2$ in one cycle tend to be zero. A time from when the first non-return valve module 11 is turned off to when the second non-return valve module 12 is turned on is less than or equal to the hold-up time. Therefore, when the first power signal $S_1$ is in the power interruption condition or the voltage dip condition, the normal second power signal $S_2$ continues to supply power so as to maintain the intelligent stable power supply system continuously normally provides output voltage.

Moreover, when the control unit 100 determines that both the first voltage value $V_1$ and the second voltage value $V_2$ are less than the first predetermined value $V_{TH1}$ or greater than the second predetermined value $V_{TH2}$, or one of both is less than the first predetermined value $V_{TH1}$ and the other is greater than the second predetermined value $V_{TH2}$, the control unit 100 controls the first non-return valve module 11 and the second non-return valve module 12 to maintain their present operation states (on or off states) so that the hold-time circuit 31 provides a voltage during a hold-up time to maintain the output of the DC power signal $S_D$.

In one embodiment, as shown in FIG. 2, the first non-return valve module 11 includes a first non-return valve 111 and a second non-return valve 112 connected in series with each other. The first non-return valve 111 has a first L non-return valve 111L and a first N non-return valve 111N, and the second non-return valve 112 has a second L non-return valve 112L and a second N non-return valve 112N. The second non-return valve module 12 includes a third non-return valve 121 and a fourth non-return valve 122 connected in series with each other. The third non-return valve 121 has a third L non-return valve 121L and a third N non-return valve 121N, and the fourth non-return valve 122 has a fourth L non-return valve 122L and a fourth N non-return valve 122N.

The first L non-return valve 111L is connected in parallel to a first L body diode D11L, and the first N non-return valve 111N is connected in parallel to a first N body diode D11N. The second L non-return valve 112L is connected in parallel to a second L body diode D12L, and the second N non-return valve 112N is connected in parallel to a second N body diode D12N. An anode of the first L body diode D11L is coupled in series to an anode of the second L body diode D12L, or a cathode of the first L body diode D11L is coupled in series to a cathode of the second L body diode D12L. An anode of the first N body diode D11N is coupled in series to an anode of the second N body diode D12N, or a cathode of the first N body diode D11N is coupled in series to a cathode of the second N body diode D12N.

In one embodiment, the first non-return valve module 11 includes a first non-return valve 111 and a second non-return valve 112 connected in series with each other. The circuit structure is similar to the above-mentioned embodiment, wherein the L line of the first power signal is the same as the above-mentioned circuit structure. The difference is that the N line (not shown) of the first power input module 91 is connected to the active pulse wave generation unit 20 by a wire. The structure of the second non-return valve module 12 is the same as that of the first non-return valve module 11, and the detail description is omitted here for conciseness.

In one embodiment, the first non-return valve 111 and the second non-return valve 112 may be, for example, but not limited to, transistor switches. The first non-return valve 111 is connected to the first power input module 91, and the second non-return valve 112 is connected to the active pulse wave generation unit 20.

Similarly, the second non-return valve module 12 includes a third non-return valve 121 and a fourth non-return valve 122 connected in series with each other. The circuit characteristics and structure of the second non-return valve module 12 are the same as those of the first non-return valve module 11, and the detail description may refer to FIG. 2 and is omitted here for conciseness.

Please refer to FIG. 8, when the above-mentioned power interruption or voltage dip occurs, the control unit 100 firstly control the first non-return valve module 11 from the on state to the off state, and then controls the second non-return valve module 12 from the off state to the on state. The first non-return valve module 11 includes a first non-return valve 111 and a second non-return valve 112 connected in series with each other, and respectively have a diode connected in parallel. When the respective transistors are turned off, a high-impedance path is formed in parallel with the transistors. Therefore, if the first non-return valve 111 and the second non-return valve 112 are allowed to be randomly controlled to be turned on or off successively according to the speed of the control signal, there must be a high chance of taking the high-impedance path (diode path).

In one embodiment, when the first non-return valve module 11 wants to be turned off and the first L non-return valve 111L receives a turned-off signal before the second L non-return valve 112L receives the turned-off signal, or when the first non-return valve module 11 wants to be turned on and the second L non-return valve 112L receives a turned-on signal before the first L non-return valve 111L receives the turned-on signal, the first power signal $S_1$ flows to the active pulse wave generation unit 20 through a path provided by the first L body diode D11L and the second L non-return valve 112L during a time period, thereby increasing energy consumption.

Therefore, in order to control the first non-return valve module 11 being from the on state to the off state, the control unit 100 firstly turns off the second L non-return valve 112L and the second N non-return valve 112N of the second non-return valve 112, and then turns off the first L non-return valve 111L and the first N non-return valve 111N of the first non-return valve 111 so that the first non-return valve module 11 is turned off. Moreover, in order to control the second non-return valve module 12 being from the off state to the on state, the control unit 100 firstly turns on the third L non-return valve 121L and the third N non-return valve 121N of the third non-return valve 121, and then turns on the fourth L non-return valve 122L and the fourth N non-return valve 122N of the fourth non-return valve 122 so that the second non-return valve module 12 is turned on.

Specifically, when the first non-return valve module 11 is turned off and the second non-return valve module 12 is turned on, and the control unit 100 determines that the first voltage value $V_1$ is between the first predetermined value $V_{TH1}$ and the second predetermined value $V_{TH2}$, the control unit 100 firstly turns off the second non-return valve module 12 and then turns on the first non-return valve module 11 so that the first power signal $S_1$ flows into the active pulse wave generation unit 20 and the DC power processing unit 30 to output the DC power signal $S_D$. A time from when the second non-return valve module 12 is turned off to when the first non-return valve module 11 is turned on is less than or equal to the hold-up time.

In other words, when the first power supply returns to normal, since the second non-return valve module 12 is firstly controlled being from the on state to the off state (shown in FIG. 7), and then the first non-return valve module 11 is controlled being from the off state to the on state (shown in FIG. 7), in order to control the second non-return valve module 12 being from the on state to the off state, the control unit 100 firstly turns off the fourth L non-return valve 122L and the fourth N non-return valve 122N of the fourth non-return valve 122, and then turns off the third L non-return valve 121L and the third N non-return valve 121N of the third non-return valve 121 (shown in FIG. 8) so that the second non-return valve module 12 is turned off. Moreover, in order to control the first non-return valve module 11 being from the off state to the on state, the control unit 100 firstly turns on the first L non-return valve 111L and the first N non-return valve 111N of the first non-return valve 111, and then turns on the second L non-return valve 112L and the second N non-return valve 112N of the second non-return valve 112 (shown in FIG. 8) so that the first non-return valve module 11 is turned on.

In one embodiment, when a predetermined event occurs, the control unit 100 firstly controls the first non-return valve module 11 being from the on state to the off state, and then controls the second non-return valve module 12 being from the off state to the on state so that the second power signal $S_2$ flows into the active pulse wave generation unit 20 and the DC power processing unit 30 to output the DC power signal $S_D$.

Conditions for the occurrence of the predetermined event, such as voltage variation, specific time, or change in electricity prices, etc., but not limited to this. The voltage variation means that the first voltage value $V_1$ is less than the first predetermined value $V_{TH1}$ or greater than the second predetermined value $V_{TH2}$. The specific time means that to the time point set by the user. The change in electricity prices means that the price difference between peak and off-peak electricity consumption, or when the electricity price provided by another electricity supplier is cheaper than the electricity price provided by the existing electricity supplier in operation, and the fluctuation of the electricity price may be automatically searched on the Internet through a program or manually set.

When the above-mentioned predetermined event occurs, and the second voltage value $V_2$ is between the first predetermined value $V_{TH1}$ and the second predetermined value $V_{TH2}$, the control unit 100 will firstly control the first non-return valve module 11 being from the on state to the off state, and then control the second non-return valve module 12 being from the off state to the on state.

Figure 4:
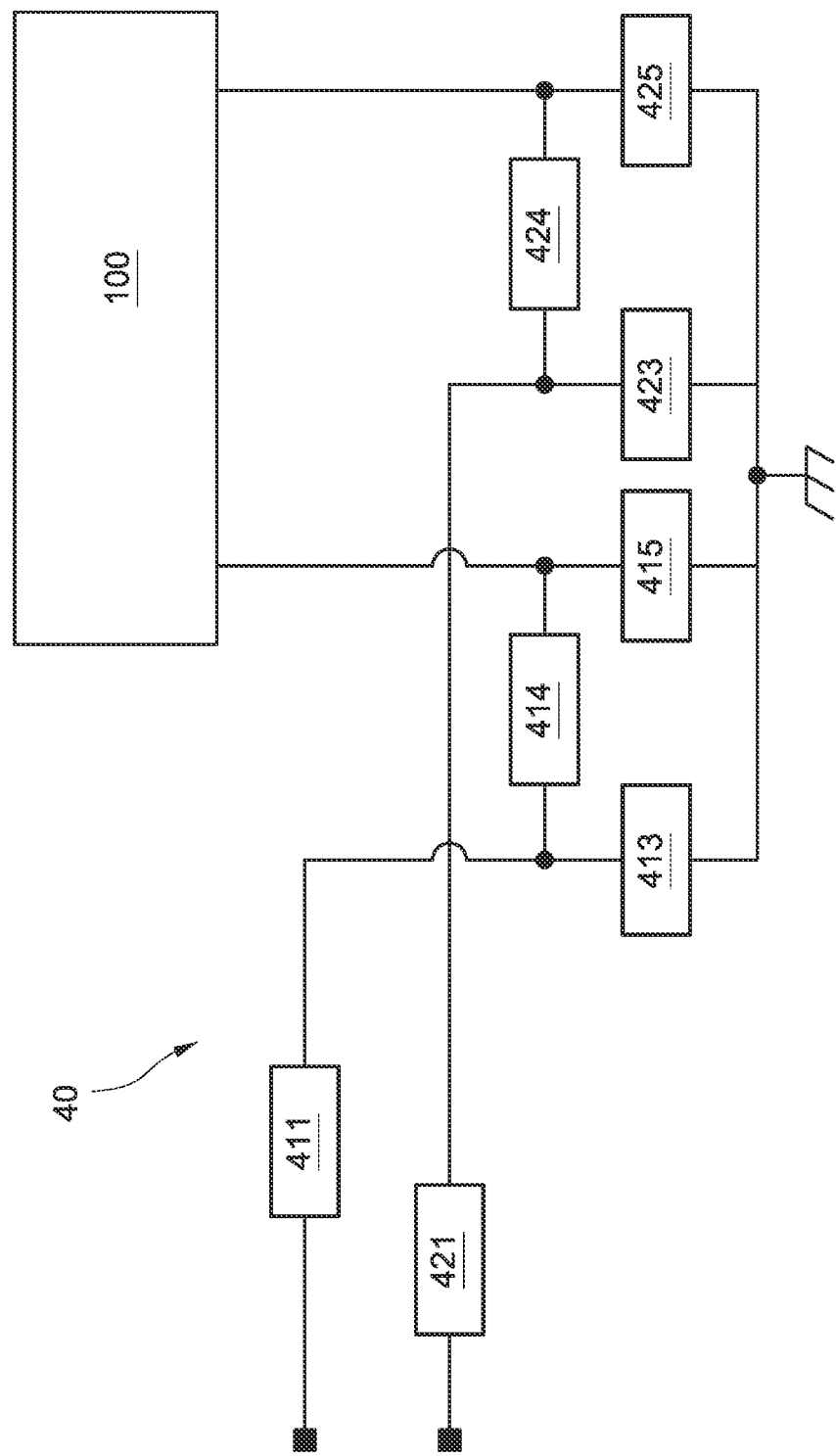
FIG. 4 is a block diagram of a detection unit according to the present disclosure.

Please refer to FIG. 4, which shows a block diagram of a detection unit according to the present disclosure. For the detection unit 40 of the corresponding first power input module 91, the detection unit 40 includes a first resistor 411, a second resistor 413, a third resistor 414, and a first capacitor 415. The first resistor 411 is coupled between the second resistor 413 and the first power input module 91. The third resistor 414 is connected in series to the first capacitor 415, and then connected in parallel to the second resistor 413. A node between the third resistor 414 and the first capacitor 415 is coupled to the control unit 100. For the detection unit 40 of the corresponding second power input module 92, the detection unit 40 includes a first resistor 421, a second resistor 423, a third resistor 424, and a first capacitor 425. The first resistor 421 is coupled between the second resistor 423 and the second power input module 92. The third resistor 424 is connected in series to the first capacitor 425, and then connected in parallel to the second resistor 423. Anode between the third resistor 424 and the first capacitor 425 is coupled to the control unit 100. Therefore, the detection unit 40 has a circuit detecting part (including the first resistors and the second resistors) and a circuit shielding part (including the third resistors and first capacitors). Furthermore, the circuit shielding part can achieve the purpose of shielding noise through the integral action. Therefore, a start-up time required can be designed by the circuit designer through the combination of the resistance value of the third resistor and the capacitance value of the first capacitor according to practical needs. For example, when the voltage drops to UVLO (under voltage lockout) or the voltage reaches to the minimum startup voltage for 2 to 3 pulses, a command to switch to another input voltage source is triggered. Accordingly, the detection unit 40 is used to detect the first power signal $S_1$ outputted by the first power input module 91 or the second power signal $S_2$ outputted by the second power input module 92, and eliminates noise interference.

Figure 3:
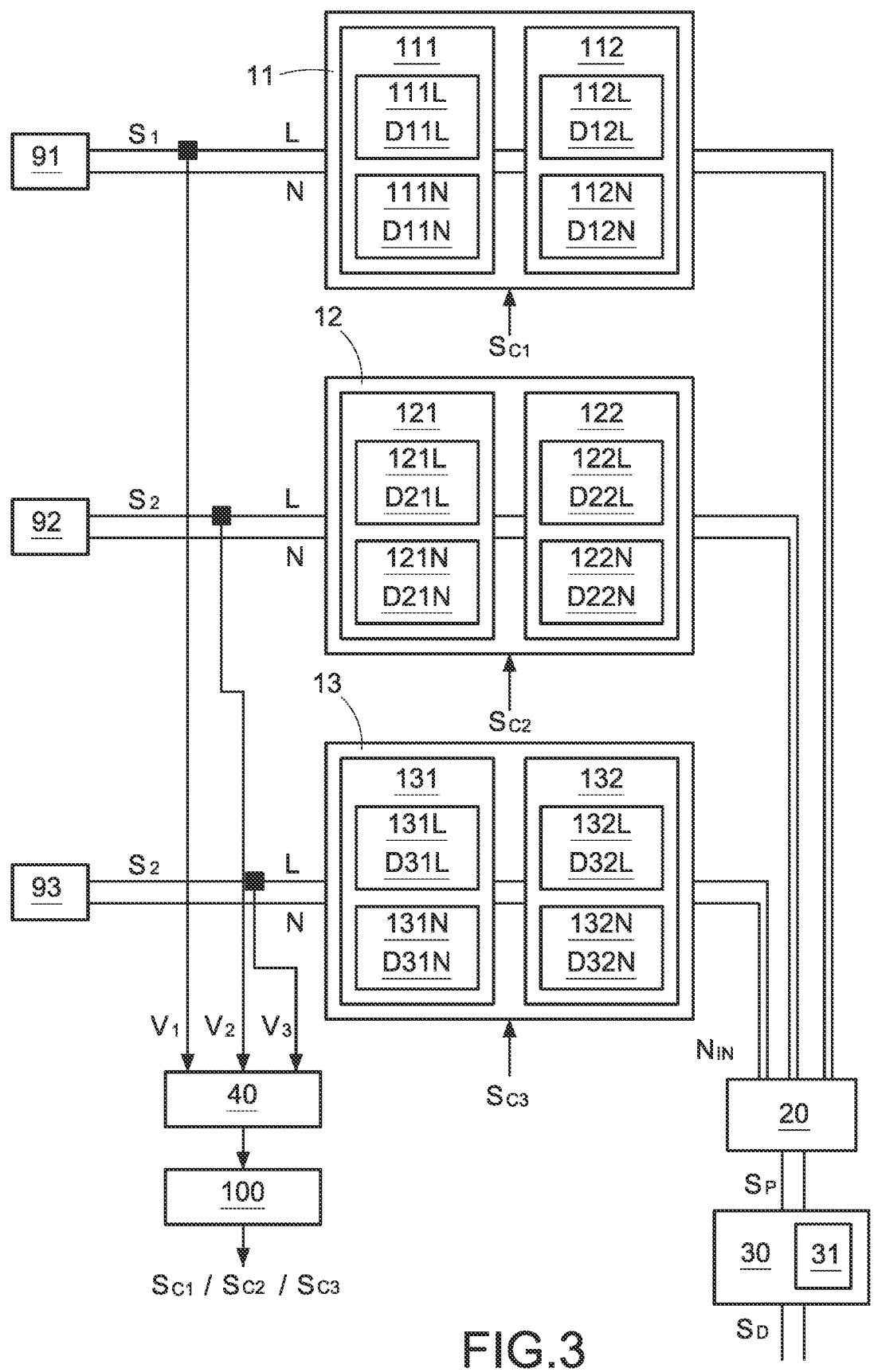
FIG. 3 is a detailed block diagram of the intelligent stable power supply system according to a second embodiment of the present disclosure.

Please refer to FIG. 3, which shows a detailed block diagram of the intelligent stable power supply system according to a second embodiment of the present disclosure. In comparison with the first embodiment shown in FIG. 1 or FIG. 2, the second embodiment shown in FIG. 3 further includes a third power input module 93 and a third non-return valve module 13. The third non-return valve module 13 includes a fifth non-return valve 131 and a sixth non-return valve 132. The fifth non-return valve 131 includes a fifth L non-return valve 131L, a fifth N non-return valve 131N, a fifth L body diode D31L, and a fifth N body diode D31N. The sixth non-return valve 132 includes a sixth L non-return valve 132L, a sixth N non-return valve 132N, a sixth L body diode D32L, and a sixth N body diode D32N. Since the operation principle of the third non-return valve module 13 is the same as that of the first non-return valve module 11 and the second non-return valve module 12, and the detail description is omitted here for conciseness. Incidentally, the operation method of the three sets of power input modules and non-return valve modules shown in FIG. 3 are different from the operation method of the two sets of power input modules and non-return valve modules shown in FIG. 1 or FIG. 2. In other words, the principle and spirit of their operation of three or more than three power input modules and non-return valve modules can be implemented corresponding to the structure shown in FIG. 3, and therefore the same circuit structure or operation as the first embodiment is omitted here for conciseness.

When the first non-return valve module 11 is turned-on (in the on state), the second non-return valve module 12 and the third non-return valve module 13 are turned-off (in the off state). When the second non-return valve module 12 is turned-on (in the on state), the first non-return valve module 11 and the third non-return valve module 13 are turned-off (in the off state). Similarly, when the third non-return valve module 13 is turned-on (in the on state), the first non-return valve module 11 and the second non-return valve module 12 are turned-off (in the off state).

The active pulse wave generation unit 20 is connected to the first non-return valve module 11, the second non-return valve module 12, and the third non-return valve module 13, and receives the first power signal $S_1$ provided from the first power input module 91 through the first non-return valve module 11, the second power signal $S_2$ provided from the second power input module 92 through the second non-return valve module 12, or the third power signal $S_3$ provided from the third power input module 93 through the third non-return valve module 13. Moreover, the active pulse wave generation unit 20 makes the positive half-cycle and the negative half-cycle of the first power signal $S_1$, those of the second power signal $S_2$, or those of the third power signal $S_3$ in turned into a half-cycle in the same direction, and then continuously outputs a pulse signal SP.

The control unit 100 controls the detection unit 40 to detect and return the first voltage value $V_1$ of the first power signal $S_1$, the second voltage value $V_2$ of the second power signal $S_2$, and the third voltage value $V_3$ of the third power signal $S_3$.

Moreover, when the control unit 100 determines that the first voltage value $V_1$ is less than the first predetermined value $V_{TH1}$ or greater than the second predetermined value $V_{TH2}$, the control unit 100 firstly controls the first non-return valve module 11 to be turned off (for example, a first control signal $S_{C1}$ that controls the first non-return valve module 11 changes from a high level to a low level), and then controls the second non-return valve module 12 or the third non-return valve module 13 to be turned on (for example, a second control signal $S_{C2}$ that controls the second non-return valve module 12 or a third control signal $S_{C3}$ that controls the third non-return valve module 13 changes from a low level to a high level) so that the second power signal $S_2$ or the third power signal $S_3$ flows into the active pulse wave generation unit 20 and the DC power processing unit 30 to output the DC power signal $S_D$.

The current intensity and current direction of the first power signal $S_1$, the second power signal $S_2$, and the third power signal $S_3$ respectively have periodic changes, and the average current value of the first power signal $S_1$, the average current value of the second power signal $S_2$, and the average current value of the third power signal $S_3$ in one cycle tend to be zero. A time from when the first non-return valve module 11 is turned off to when the second non-return valve module 12 or the third non-return valve module 13 is turned on is less than or equal to the hold-up time.

For the intelligent stable power supply system of the second embodiment, at least two manners of operation control may be provided. The specific description is as follows.

Figure 5:
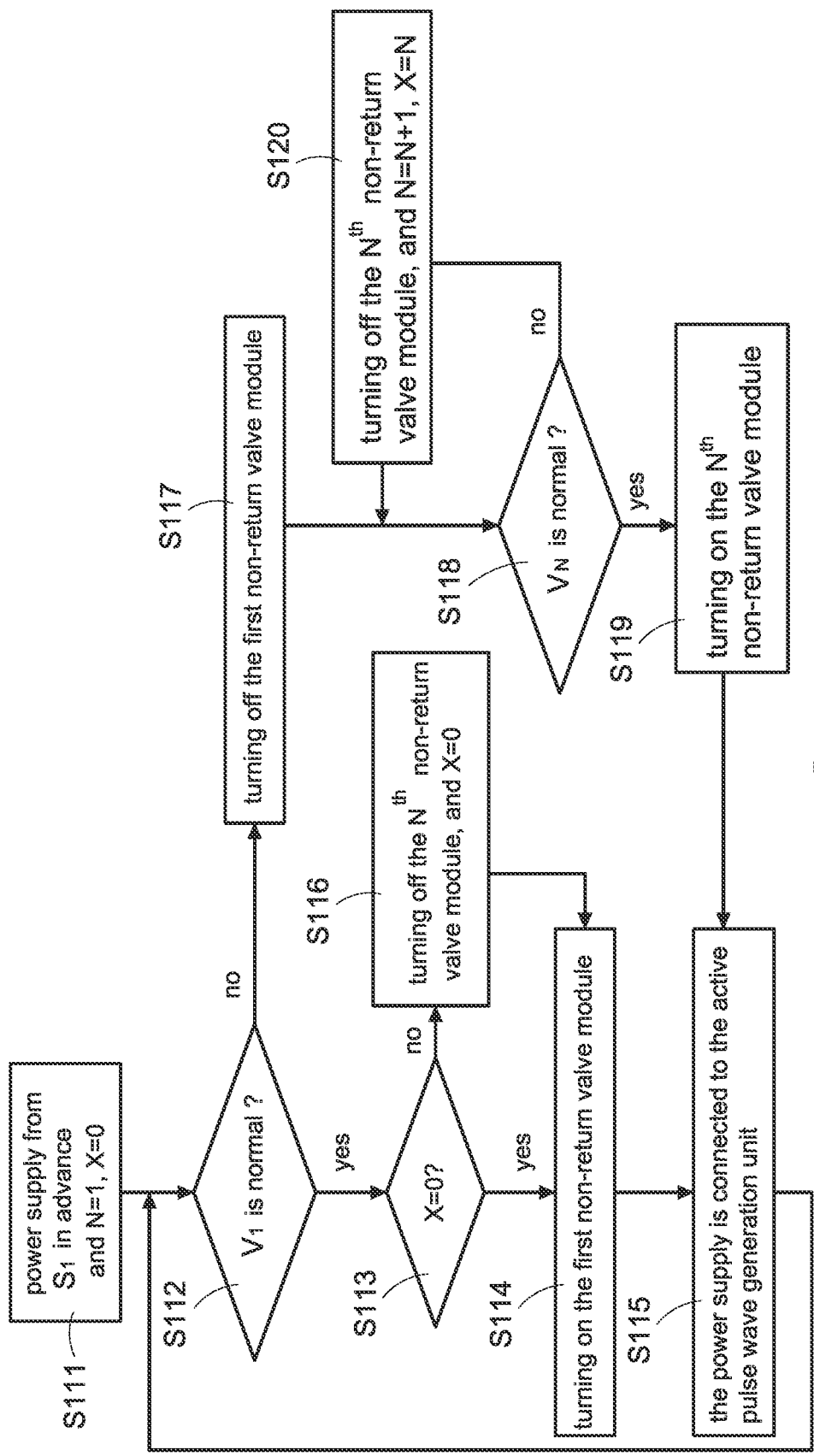
FIG. 5 is a flowchart of a first mode operation of a control unit according to the present disclosure.

As shown in FIG. 5, when the control unit 100 is in a first mode (i.e., a polling mode), and the control unit 100 determines that the first voltage value $V_1$ is less than the first predetermined value $V_{TH1}$ or greater than the second predetermined value $V_{TH2}$ (corresponding to step S112), the control unit 100 firstly controls the first non-return valve module 11 to be turned off (corresponding to step S117), and the control unit 100 controls the detection unit 40 to detect the second voltage value $V_2$. When the control unit 100 determines that the second voltage value $V_2$ is between the first predetermined value $V_{TH1}$ and the second predetermined value $V_{TH2}$, the control unit 100 then controls the second non-return valve module 12 to be turned on (corresponding to step S119).

When the control unit 100 determines that the second voltage value $V_2$ is less than the first predetermined value $V_{TH1}$ or is greater than the second predetermined value $V_{TH2}$ (corresponding to step S118), the control unit 100 firstly controls the second non-return valve module 12 to be turned off (corresponding to step S120), and the control unit 100 controls the detection unit 40 to detect the third voltage value $V_3$. When the control unit 100 determines that the third voltage value $V_3$ is between the first predetermined value $V_{TH1}$ and the second predetermined value $V_{TH2}$, the control unit 100 then controls the third non-return valve module 13 to be turned on (corresponding to step S119).

When the control unit 100 determines that the first voltage value $V_1$ is restored to be between the first predetermined value $V_{TH1}$ and the second predetermined value $V_{TH2}$, the control unit 100 firstly controls the second non-return valve module 12 or the third non-return valve module 13 in operation to be turned off (corresponding to step S116), and then controls the first non-return valve module 11 to be turned on (corresponding to step S114) so that the first power signal $S_1$ flows into the active pulse wave generation unit 20 and the DC power processing unit 30 to output the DC power signal $S_D$.

Figure 6:
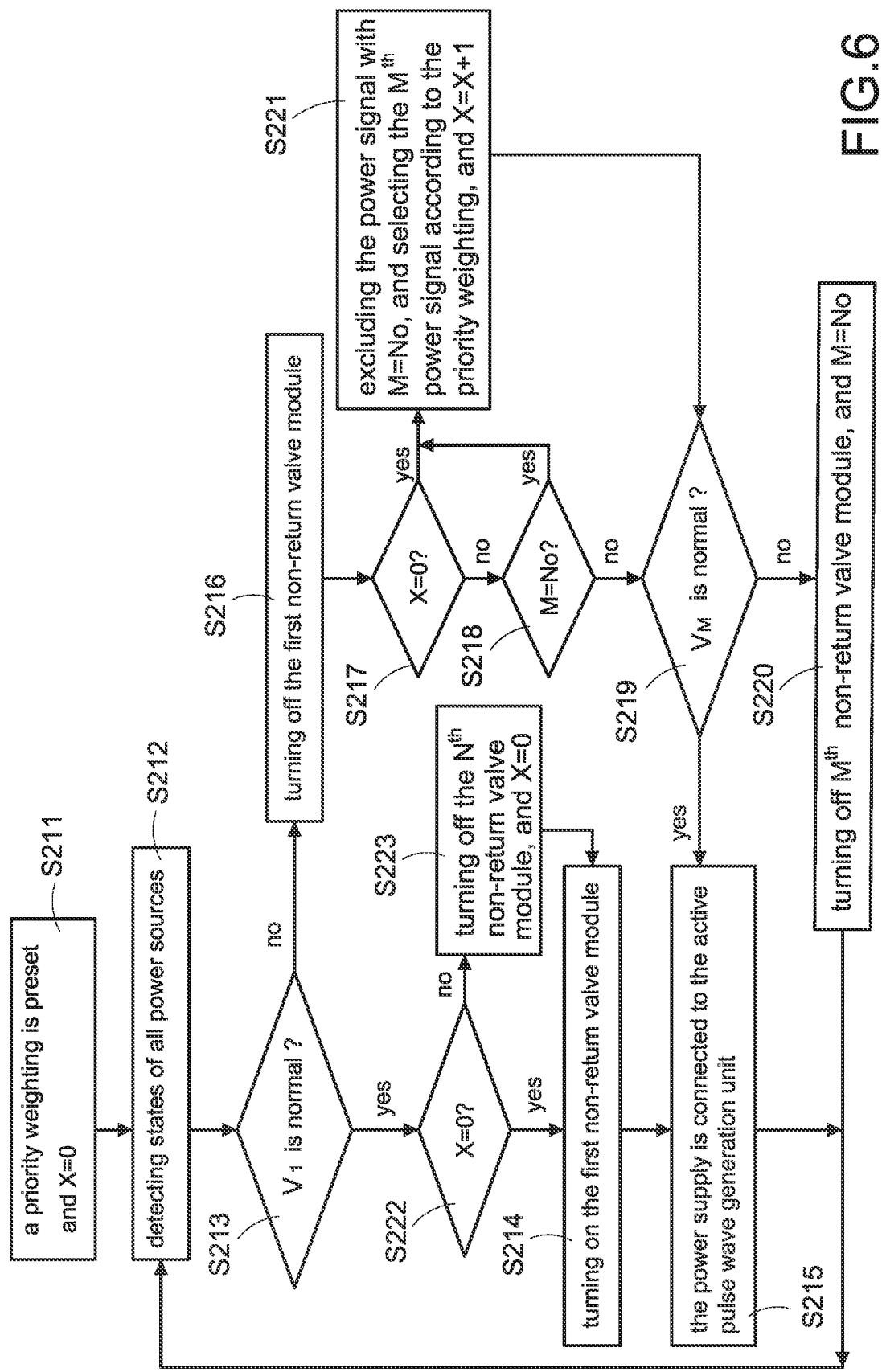
FIG. 6 is a flowchart of a second mode operation of the control unit according to the present disclosure.

As shown in FIG. 6, when the control unit 100 is in a second mode (i.e., a weighting priority mode), the control unit 100 has preset the priority (weighting priority) of each power signal, for example, but not limited to, the first power signal $S_1$>the second power signal $S_2$>the third power signal $S_3$ (that is, the first power signal $S_1$ has priority over the second power signal $S_2$, and the second power signal $S_2$ has priority over the third power signal $S_3$). The control unit 100 controls the detection unit 40 simultaneously detecting the first voltage value $V_1$, the second voltage value $V_2$, and the third voltage value $V_3$ (corresponding to step S212). When the control unit 100 determines that the first voltage value $V_1$ is less than the first predetermined value $V_{TH1}$ or greater than the second predetermined value $V_{TH2}$ (corresponding to step S213), and the second voltage value $V_2$ and the third voltage value $V_3$ are both between the first predetermined value $V_{TH1}$ and the second predetermined value $V_{TH2}$, the control unit 100 firstly controls the first non-return valve module 11 to be turned off (corresponding to step S216), and the control unit 100 then controls the second non-return valve module 12 or the third non-return valve module 13 with a higher priority (weighting priority) to be turned on.

When the control unit 100 determines that the first voltage value $V_1$ is restored to be between the first predetermined value $V_{TH1}$ and the second predetermined value $V_{TH2}$ (corresponding to step S213), the control unit 100 firstly controls the second non-return valve module 12 or the third non-return valve module 13 with a higher priority (weighting priority) in operation to be turned off (corresponding to step S223), and then controls the first non-return valve module 11 to be turned on (corresponding to step S214) so that the first power signal $S_1$ flows into the active pulse wave generation unit 20 and the DC power processing unit 30 to output the DC power signal $S_D$.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An intelligent stable power supply system comprising:
a first power input module,
a first non-return valve module, connected to the first power input module,
wherein the first non-return valve module comprises a first non-return valve and a second non-return valve,
wherein the first non-return valve has a first body diode, and the second non-return valve has a second body diode; an anode of the first body diode is connected in series to an anode of the second body diode, or a cathode of the first body diode is connected in series to a cathode of the second body diode,
an active pulse wave generation unit, connected to the first non-return valve module through an input end, and the active pulse wave generation unit configured to make a positive half-cycle and a negative half-cycle of a power signal received by the input end in turned into a half-cycle in the same direction, and then continuously output a pulse signal,
a DC power processing unit, configured to receive and process the pulse signal, and output a DC power signal, the DC power processing unit comprising a hold-up time circuit, and the hold-up time circuit configured to provide a voltage during a hold-up time to maintain an output of the DC power signal, and
a control unit, configured to control a detection unit to detect and return a first voltage value of the first power input module and a second voltage value of a second power input module,
wherein when the control unit determines that the first voltage value is less than a first predetermined value or greater than a second predetermined value, and the second voltage value is between the first predetermined value and the second predetermined value, the control unit firstly controls the first non-return valve module being from an on state to an off state to prevent a power signal of the second power input module from flowing into the first power input module, and then control a second non-return valve module connected to the second power input module being from an off state to an on state so that the power signal of the second power input module flows into the active pulse wave generation unit and the DC power processing unit to output the DC power signal,
wherein the current intensity and the current direction of a power signal of the first power input module and the power signal of the second power input module received by the input end of the active pulse wave generation unit have periodic changes, and an average current value of the power signal of the first power input module is zero in one cycle and the average current value of the power signal of the second power input module is zero in one cycle,
wherein a time from when the first non-return valve module is turned off to when the second non-return valve module is turned on is less than or equal to the hold-up time.

2. The intelligent stable power supply system as claimed in claim 1, wherein when the control unit determines that the first voltage value and the second voltage value are both less than the first predetermined value or greater than the second predetermined value, the control unit controls the first non-return valve module to maintain the on state, and controls the second non-return valve module to maintain the off state.

3. The intelligent stable power supply system as claimed in claim 1, wherein the first non-return valve is connected to the first power input module, and the second non-return valve is connected to the active pulse wave generation unit; the control unit firstly controls the second non-return valve being turned off, and then controls the first non-return valve being turned off so as to turn off the first non-return valve module.

4. The intelligent stable power supply system as claimed in claim 1, wherein when the first non-return valve module is turned off and the second non-return valve module is turned on, and the control unit determines that the first voltage value is between the first predetermined value and the second predetermined value, the control unit firstly controls the second non-return valve module being turned off, and then controls the first non-return valve module being turned on so that a first power signal flows into the active pulse wave generation unit and the DC power processing unit to output the DC power signal; wherein the time from when the second non-return valve module is turned off to when the first non-return valve module is turned on is less than or equal to the hold-up time.

5. The intelligent stable power supply system as claimed in claim 4, wherein the first non-return valve is connected to the first power input module, and the second non-return valve is connected to the active pulse wave generation unit; the control unit firstly controls the first non-return valve being turned on, and then controls the second non-return valve being turned on so as to turn on the first non-return valve module.

6. The intelligent stable power supply system as claimed in claim 1, wherein the detection unit comprises a first resistor, a second resistor, a third resistor, and a first capacitor,
wherein the first resistor is coupled between the second resistor and the first power input module, or between the second resistor and the second power input module; the third resistor is connected in series to the first capacitor and then is connected in parallel to the second resistor; a node between the third resistor and the first capacitor is coupled to the control unit; the detection unit is configured to detect the first power input module or the second power input module, and eliminates noise interference.

7. An intelligent stable power supply system comprising:
a first power input module,
a first non-return valve module, connected to the first power input module,
wherein the first non-return valve module comprises a first non-return valve and a second non-return valve, wherein the first non-return valve has a first body diode, and the second non-return valve has a second body diode; an anode of the first body diode is connected in series to an anode of the second body diode, or a cathode of the first body diode is connected in series to a cathode of the second body diode, a second power input module, a second non-return valve module, connected to the second power input module, a third power input module, a third non-return valve module, connected to the third power input module, wherein when the first non-return valve module is in an on state, the second non-return valve module and the third non-return valve module are in an off state; when the second non-return valve module is in the on state, the first non-return valve module and the third non-return valve module are in the off state; when the third non-return valve module is in the on state, the first non-return valve module and the second non-return valve module are in the off state, an active pulse wave generation unit, connected to the first non-return valve module, the second non-return valve module, and the third non-return valve module to respectively receive a first power signal provided by the first power input module and flowing through the first non-return valve module, a second power signal provided by the second power input module and flowing through the second non-return valve module, or a third power signal provided by the third power input module and flowing through the third non-return valve module, and the active pulse wave generation unit configured to make a positive half-cycle and a negative half-cycle of the first power signal, a positive half-cycle and a negative half-cycle of the second power signal, or a positive half-cycle and a negative half-cycle of the third power signal in turned into a half-cycle in the same direction, and then continuously output a pulse signal, a DC power processing unit, configured to receive and process the pulse signal, and output a DC power signal, the DC power processing unit comprising a hold-up time circuit, and the hold-up time circuit configured to provide a voltage during a hold-up time to maintain an output of the DC power signal, and a control unit, configured to control a detection unit to detect and return a first voltage value of the first power input module, a second voltage value of the second power input module, and a third voltage value of the third power input module, wherein when the control unit determines that the first voltage value is less than a first predetermined value or greater than a second predetermined value, the control unit firstly controls the first non-return valve module being turned off, and then controls the second non-return valve module or the third non-return valve module being turned on so that the second power signal or the third power signal flows into the active pulse wave generation unit and the DC power processing unit to output the DC power signal, wherein the current intensity and the current direction of the first power signal, the second power signal, and the third power signal have periodic changes, and an average current value of the first power signal is zero in one cycle, the average current value of the second power signal is zero in one cycle, and the average current value of the third power signal is zero in one cycle, wherein a time from when the first non-return valve module is turned off to when the second non-return valve module is turned on or to when the third non-return valve module is turned on is less than or equal to the hold-up time.

8. The intelligent stable power supply system as claimed in claim 7, wherein when the control unit is in a first mode, and the control unit determines that the first voltage value is less than the first predetermined value or greater than the second predetermined value, the control unit controls the detection unit to detect the second voltage value; when the control unit determines that the second voltage value is between the first predetermined value and the second predetermined value, the control unit firstly controls the first non-return valve module being turned off, and then controls the second non-return valve module being turned on.

9. The intelligent stable power supply system as claimed in claim 8, wherein when the control unit determines that the second voltage value is less than the first predetermined value or greater than the second predetermined value, the control unit controls the detection unit to detect the third voltage value; when the control unit determines that the third voltage value is between the first predetermined value and the second predetermined value, the control unit firstly controls the second non-return valve module being turned off, and then controls the third non-return valve module being turned on.

10. The intelligent stable power supply system as claimed in claim 9, wherein when the control unit determines that the first voltage value is between the first predetermined value and the second predetermined value, the control unit firstly controls the second non-return valve module or the third non-return valve being turned off, and then controls the first non-return valve module being turned on.

11. The intelligent stable power supply system as claimed in claim 7, wherein when the control unit is in a second mode, and the control unit controls the detection unit to simultaneously detect the first voltage value, the second voltage value, and the third voltage value; when the control unit determines that the first voltage value is less than the first predetermined value or greater than the second predetermined value, and the second voltage value and the third voltage value are both between the first predetermined value and the second predetermined value, the control unit firstly controls the first non-return valve module being turned off, and then controls the second non-return valve module or the third non-return valve module with a higher priority being turned on.

12. The intelligent stable power supply system as claimed in claim 11, wherein when the control unit determines that the first voltage value is between the first predetermined value and the second predetermined value, the control unit firstly controls the second non-return valve module or the third non-return valve module being turned off, and then controls the first non-return valve module being turned on.

13. The intelligent stable power supply system as claimed in claim 12, wherein the first non-return valve is connected to the first power input module, and the second non-return valve is connected to the active pulse wave generation unit; the control unit firstly controls the second non-return valve being turned off, and then controls the first non-return valve being turned off so as to turn off the first non-return valve module.

\* \* \* \* \*